United States Patent
Klinger et al.

(10) Patent No.: US 6,523,071 B1
(45) Date of Patent: Feb. 18, 2003

(54) PROCESS AND APPARATUS FOR CONFIGURING THE DIRECT MEMORY ACCESS TRANSFER MODE OF A MOTHERBOARD OR HOST COMPUTER

(75) Inventors: Werner Klinger, Fontaine (FR); Pascal Oudet, Brignoud (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/528,525

(22) Filed: Mar. 20, 2000

(30) Foreign Application Priority Data

Nov. 5, 1999 (EP) .............................. 99410154

(51) Int. Cl.$^7$ ................................. G06F 3/00
(52) U.S. Cl. ............................. 710/10; 710/15; 710/16; 710/22
(58) Field of Search ........................ 710/10, 2, 8, 15, 710/16, 22, 27, 28, 36

(56) References Cited

U.S. PATENT DOCUMENTS

| | | | | |
|---|---|---|---|---|
| 5,491,814 A | * | 2/1996 | Yee et al. ...................... | 710/60 |
| 5,678,065 A | * | 10/1997 | Lee et al. ...................... | 710/60 |
| 5,687,371 A | * | 11/1997 | Lee et al. ...................... | 703/28 |
| 5,727,184 A | * | 3/1998 | Richter et al. .............. | 710/305 |
| 5,809,291 A | * | 9/1998 | Munoz-Bustamante et al. | 713/400 |
| 5,909,369 A | * | 6/1999 | Gopinath et al. ............. | 700/12 |
| 6,425,041 B1 | * | 7/2002 | Klein ......................... | 710/306 |

OTHER PUBLICATIONS

T13/D98133 revision 1 Proposal for Ultra ATA/66; To: T13 Technical committee; From Mark Evans Quantum Corporation, 500 McCarthy Blvd., Milpitas, CA USA 95035 Phone(408) 894–4019; Fax (408) 952–3620; Dec. 8, 1998; subj: "Proposal to add two new transfer rates . . . "; 12 pages.

T13/D98133 revision 4 Proposal for Ultra ATA/66; To: T13 Technical committee; From Mark Evans Quantum Corporation, 500 McCarthy Blvd., Milpitas, CA USA 95035 Phone(408) 894–4019; Fax (408) 952–3620; Apr. 29, 1999; subj: "Proposal to add two new transfer rates . . . "; 17 pages.

ANSI NCITS 317–1998 American National Standard (ANSI NCITS 317–1998); AT Attachment with Packet Interface Extension (ATA/ATAPI–4); Published by ANSI, Inc. 11 West 42nd Street, New York, NY 10036; Copyright 1999; 323 pages.

* cited by examiner

*Primary Examiner*—Jeffrey Gaffin
*Assistant Examiner*—Harold Kim

(57) ABSTRACT

A process and apparatus for configuring a motherboard or host computer (3) to operate direct memory transfer mode, such as Ultra-DMA or Ultra-ATA, in accordance with the particular type of cable—IDE or 40-conductor cable being used. The 80-conductor cable has one particular conductor which is cut between the host connector and the device connectors and which corresponds to a terminal which the device releases when it receives a reset pulse. On the host side the terminal is internally connected to ground. A sampling of the logical state carried by the particular terminal is performed during a reset pulse transmitted to the device(s), in order to determine the type of cable, and configure the Ultra-DMA mode accordingly. The invention is well adapted for the 80-conductor detection by testing pin 34 carrying the PDIAG# signal.

12 Claims, 5 Drawing Sheets

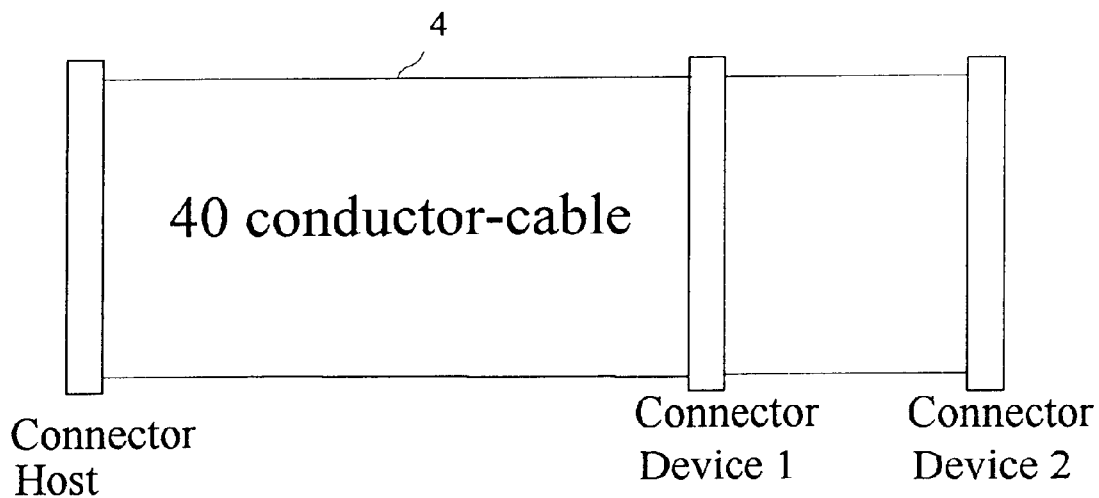
Figure 2A: IDE cable
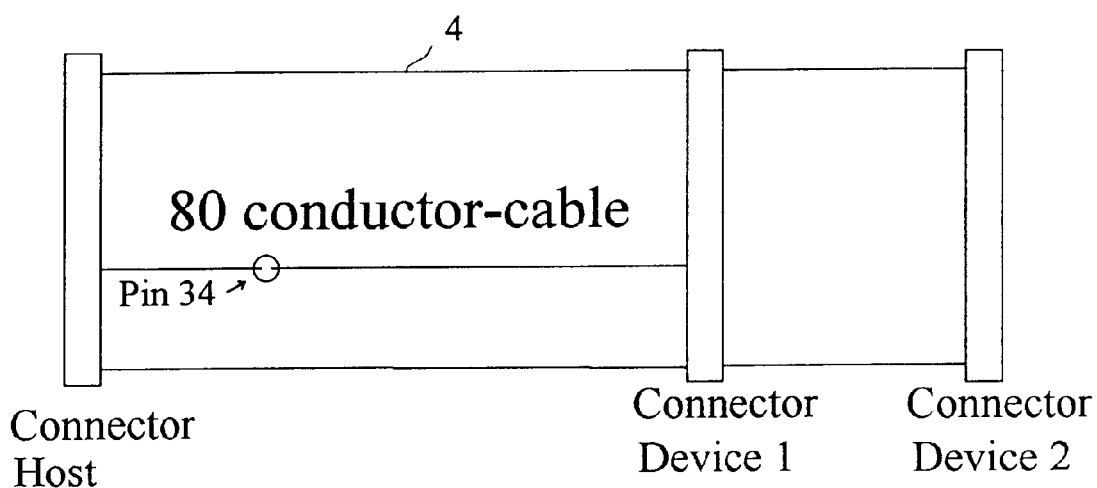
Figure 2B: Ultra ATA 66 cable

PROCESS AND APPARATUS FOR CONFIGURING THE DIRECT MEMORY ACCESS TRANSFER MODE OF A MOTHERBOARD OR HOST COMPUTER

TECHNICAL FIELD OF THE INVENTION

The invention relates to the configuration of the direct memory access transfer mode of motherboards or host computers, and more particularly to a process of configuring a motherboard receiving attachment to device(s), such as peripheral storage, in accordance with the particular cable being employed for the attachment of the device(s) to the motherboard.

BACKGROUND ART

The AT Attachment (ATA) storage interface has become very popular on most personal computers. It provides attachment between a host and storage systems for systems manufacturers, software suppliers and system integrators. The storage systems may be for instance disk drives or CDROM drives or any device or storage peripheral being placed on the interface.

FIGS. 1A to 1C illustrate the interface cabling diagram of a host computer, or more simply a motherboard 3, with one or two devices which are connected in a daisy chain configuration. FIG. 1A illustrates the attachment of two devices, a device 1 which is configured in a master mode, and a device 2 which operates as a slave. The attachment is achieved by means of AT Attachment cable 4, for instance the popular 40-connector attachment cable, also known under the designation Integrated Drive Electronics or IDE. FIGS. 1B and 1C show more particularly the attachment of one unique device to the Motherboard by means of IDE cable 4 which, in this case, operates as a master device.

The AT Attachment interface has been subject a strong effort of standardization in order to increase speed, to improve interchangeability and to bring additional functions. Most of the recommendations and regulations which have been developed in this particular technical area can be found in the publications of the Technical Committee T13 for the National Committee on Information Technology Standards (NCITS), which is accredited and operates under the rules approved by the American National Standards Institute (A.N.S.I.)

Recent developments brought to the AT Attachment interface have been formulated in the ATA-3/ATA-4 specification which define the connectors and cables for physical interconnection between the host and the devices, as well as the electrical/logical characteristics of the interconnecting signals, the commands and protocols involved in the operation of the storage device. These developments particularly recommend the replacement of the traditional 40-conductor cable by a 80-conductor cable—known as an Ultra-ATRA 66 cable—in order to improve signal quality for data transfer modes that do not require a 80-conductor cable assembly. In the near future, the popular 40-conductor IDE cable is thus expected to be superseded by the Ultra-ATA 66 cable.

Ultra-ATA cable has 80 conductors with every two conductors having one conductor being connected to the ground in order to improve the quality of the signal which is conveyed via the cable. Because of the improvement brought to the quality of the signal, the 80-conductor cable is capable of conveying higher speeds without data corruption. Ultra-ATA cable is required for Ultra-DMA modes which are greater than mode 2 (33 Megabytes per second) and is recommended for Ultra-DMA. The commands and protocols which are involved in this Ultra-ATA 66 cable are specified in the ATA-4 standards as well as in the T13 document "d98133, New timing for Ultra DMA"

A motherboard which supports the Ultra-ATA/66 is capable of operating at different modes and speeds, the Ultra-ATA/66 mode but also the lower modes. Since both 40-conductor cables and 80-conductor cables share the same physical connector, it is highly desirable to give the possibility to the processor located on the motherboard to determine which physical cable is being present for the attachment of the peripheral storage(s). Indeed, should the motherboard be configured to operate at 66 megabytes per second via a traditional IDE cable, it is most likely that data corruption might occur. Therefore ATA4 specification recommends that a cable detection circuit be implemented in order to reliably determine the presence of the 80-conductor cable for the attachment of storage devices to the motherboard, before allowing higher speeds and higher modes. Document 1153D "AT Attachment with Packet Interface Extension (ATA/ATAPI-4)", published as ANSI NCITS 317-1998 and available from ANSI, 11 West $42^{nd}$ Street, New York, N.Y. 10036, as well as document "Proposal for Ultra ATA/66", referenced T13/D98133, revision 1 of the T13 Committee, address this particular problem of 80-conductor cable detection.

The method which is proposed in these prior art documents is based on the use of a particular pin of the AT attachment interface, pin-34 which is also used for the Passed_on_diagnostics (PDIAG#) signal. Normally, the PDIAG# signal is involved in the communication between the master device 1 and the slave device 2 after the execution of the diagnostic tests in the latter. More specifically, as soon as the slave device has passed its diagnostic tests after power-on reset, the latter is expected to issue an electrical low level on the PDIAG# pin in order to inform the master device of the correct execution and completion of the diagnostic procedure. Any device which complies with ATA-3 or subsequent standards is expected, then, to release the PDIAG# pin no later than after the first command following a power on or hardware reset sequence.

In the Standards ATA-4, the cable detection is based on a special arrangement which is brought to the 80-conductor cable in order to achieve the cable detection. Indeed, in the 80-conductor cable, the pin-34, which normally carries the PDIAG# signal in the usual 40-conductor cable, is isolated between the host connector and the devices connectors. Therefore, the PDIAG# signal can no longer be transmitted to the pin-34 on the host side. On the host side the pin 34 (PGIAG#) is grounded in the enclosure of the connector and a pull-up resistance is provided on this pin on the motherboard.

The prior art method of ATA-4 specifications involves, during the Power-On Self Tests (POST), a determination of the electrical status of the pin 34 on the motherboard, which is performed after the release by the devices of the pin-34 which, as evoked above, is normally expected no later than after the first command received by the device. An alternative method is also known to take advantage of pin-34 in the cable detection process. This involves the use of a capacitor which is connected between the ground and the host connector. The device enters into a detecting step where it tries to detect the charging of the capacity which, of course, can not be detected if a 80-cable is present since pin-34 of the motherboard is isolated from Pin-34 of the devices. Such alternative is particularly addressed in document "Proposal for Ultra ATA/66", referenced T13/D98133, revision 1 of the T13 Committee The methods which are summarized above remain effective as long as the slave device shows a behavior which is that being expected, that is to say it releases the PDIAG# pin after the first command received during the first IDE transaction with the board. However, should the device behave slightly differently—which is the case for many CDROM devices—and not strictly conform to the ATA-3 specifications, the result might be a corruption of data. Indeed, if, for one reason, a CDROM slave device, for instance, does not release the pin-34 after the first command being received from the motherboard, then the motherboard will find that pin-34 carries a low level, which results from the incorrect behavior of the slave device, and not from the internal ground wiring of pin 34 of a potential 80-conductor cable being plugged in the connector. Therefore, in this case, the processor under control of the bios would make an incorrect interpretation of the low state of pin-34, and will see in the low state the evidence of the presence of a 80-conductor cable which is not present. In this situation, since the processor and the BIOS would allow higher Ultra-DMA rates, data corruption would inevitably occur.

It is therefore desirable to prevent any data corruption by enhancing the cable detection methods which are known in the art, and particularly those disclosed in the T13/D98133 and ATA-4 standards for the purpose of configuring the Ultra-DMA mode.

SUMMARY OF THE INVENTION

It is an object of the present invention to provide an enhanced direct memory access transfer configuring process, applicable for instance for Ultra-DMA configuration, which is based on a detection of the cable being independent on the compliance to the ATA-3 or subsequent standards of a device which is attached to a host or a motherboard.

This object is achieved by the process for configuring a motherboard or host computer which is defined in claim 1. Basically, the process allows to distinguish the use of a first cable of medium quality allowing communication mode at a first speed, with a second high-quality cable allowing communication mode at a second higher speed without data corruption. The high-quality cable comprises a particular conductor which is cut between the motherboard or host computer and the attached devices, and which is also internally connected to one first voltage in the enclosure of the cable. This particular conductor is chosen to correspond to one pin which the attached devices usually release when they receives a reset pulse. On the motherboard, the particular pin is pulled-up to a second voltage. The cable detection and the speed configuration is based upon the sampling, on the motherboard, of the electrical voltage of that particular terminal when a reset pulse is being transmitted to the devices via the cable. The process is then made aware of the particular type of cable which is used, and can automatically configure the speed of the communication mode in order to prevent data corruption.

The discrimination between a n-conductor medium quality cable and a n-conductor high quality cable can be achieved.

However, the invention is particularly useful in the context of the Ultra-ATA (Ultra-DMA) 80-connector cable detection and mode configuration. In this context, the particular conductor is chosen to be the $34^{th}$ conductor which carries the Passed on Diagnostic (PDIAG#) signal and the invention then permits to distinguish the popular IDE 40-conductor cable from the Ultra-ATA 80-conductor allowing Ultra-DMA mode of type greater than 2 without data corruption. The right cable detection and Ultra-DMA mode configuration is made possible, even if the attached devices do not release the PDIAG# pin after the first command, contrary to the known methods.

In a first embodiment of the invention, the sampling of the PDIAG# terminal (pin 34) is performed during the power-on by means of a sampling circuit operational during the main reset procedure of the machine, and which can sample the electrical state of the PDIAG# pin during the reset pulse. After the sampling, as soon as the processing means takes the control of the motherboard, the sampled value can be read in order to achieve the Ultra-DMA mode configuration.

In a second embodiment of the invention, the state of the PDIAG# pin is read, during a second reset occurring after the main reset procedure, and which is issued by the processor on the mother-board. During this second reset pulse which is transmitted to the devices which are connected to the ATA cable, the processing means controls the sampling of the pin-34 and the transfer of its value into a register which it may read before allowing high Ultra-DMA transfer modes. This sampling can be achieved by means of a General Purpose Input element (GPI) which is available on the motherboard.

Preferably, the reset control signal is provided by means of hardware under control of the processor, for instance with a general purpose output element (GPO) providing a reset pulse which can be transmitted via the cable to the device.

Alternatively, in a third embodiment, the reset control signal is provided into a software command under control of said processor and which is transmitted to the devices via an IDE transaction. The value read on pin-34 can be again stored into a gpi device.

A substantial advantage of this third embodiment results from the fact that minor hardware changes are required in order to embody the invention into an existing motherboard. In the case where the motherboard is already fitted with a general purpose input element which is connected to pin 34, then Ultra-ATA mode configuration is rendered possible without need for hardware changes.

In addition to a configuration process, the invention also provides with a motherboard which is fitted with automatic communication mode configuration, such as Ultra-DMA for instance. The motherboard comprises at least one host connector for receiving attachment to at least one device or peripheral storage. The attachment is made by either a first cable of medium quality for operation at said first speed or a second cable of higher-quality for operation at a second higher speed. The high-quality cable has one particular conductor which is chosen so as to correspond to a pin which is released by the attached devices when the latter are receiving a reset pulse.

The particular conductor is cut between the host connector and the device connector and the corresponding terminal on the host side is internally wired to a first voltage, for instance the ground voltage. A pull-up resistance is used to connect the terminal to a second voltage, for instance the supply voltage. The motherboard includes means for sampling the logical state of the terminal on the host connector when a reset pulse is being transmitted to the attached device(s) in order to determine the actual cable which is plugged and configure the Ultra-DMA mode accordingly.

At last, the invention provides a process for validating the assembling of an Information Handling System (IHS) comprising a motherboard (3) dedicated to communicate with at least one device or peripheral storage which is potentially attached via a cable. The motherboard comprises processing and storage means, and at least one host connector for receiving attachment to said at least one device or peripheral storage. The attachment can be performed by a first cable of medium quality allowing the first speed communication which has one particular conductor which is released by the device or peripheral storage upon reception of a reset pulse. Conversely, the attachment can be achieved by a high-quality cable which has the particular conductor which is cut and the corresponding terminal located on the host side is internally wired in the enclosure of said high-quality cable in order to received a first voltage. On the motherboard, the particular terminal is pulled-up on the motherboard to a second voltage. The validation process involves the sampling of the logical state carried by said particular terminal during a reset pulse generated by the mother board. This pulse is transmitted to the said at least one potentially attached device or peripheral storage and the result of the determination permits to detect the presence of the high quality cable in accordance with the logical state which is sampled. The assembling can thus be validated.

DESCRIPTION OF THE DRAWINGS

FIG. 2A shows the traditional IDE 40-conductors cable.

FIG. 2B shows the 80-conductors cable with the $34^{th}$ conductor being cut between the host connected and the first device connector.

DESCRIPTION OF THE PREFERRED EMBODIMENTS OF THE INVENTION

FIGS. 2A and 2B respectively show the popular IDE 40-conductor cable and the 80-conductor cable where, in accordance with the ATA-4 standard, the conductor 34 is cut between the host connector and the first device connector so that the PDIAG# signal which is generated by the slave device 2 is not transmitted to the host connector. Additionally, pin 34 is internally connected to the ground in the enclosure of the motherboard-side connector of the 80-conductor cable.

Tests revealed that better results are achieved in the cable detection process when the voltage detection is performed, not at the instant which is specified by the ATA-3 and ATA-4 standards—that is to say after the first command received by the slave device—but during the transmission of a reset pulse to the devices which are attached to the motherboard. Tests have shown that this leads to the correct detection of a 80-conductor cable for a wide number of devices, including CDROM drives, even when those do not fully comply with the ATA-3 and ATA-4 standard, and do not release the PDIAG# after the first IDE transaction.

Figure 1A:
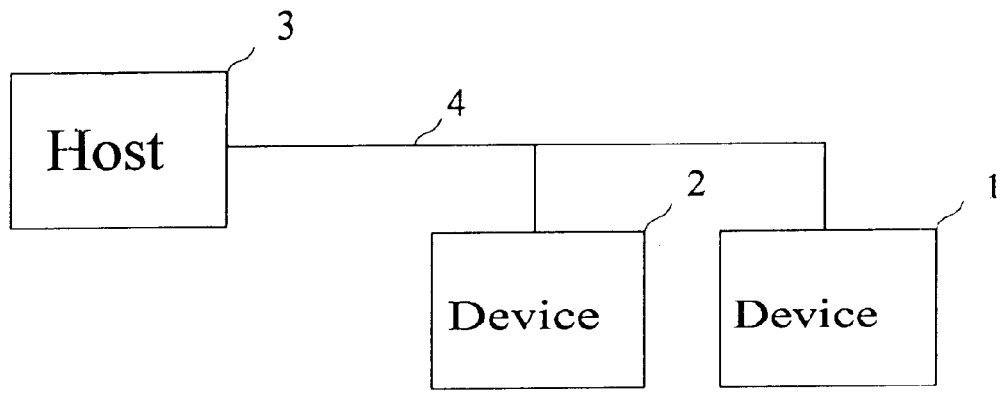
FIGS. 1A to 1C illustrate the interface cabling diagram of a host computers with one or two devices.
Figure 1B:
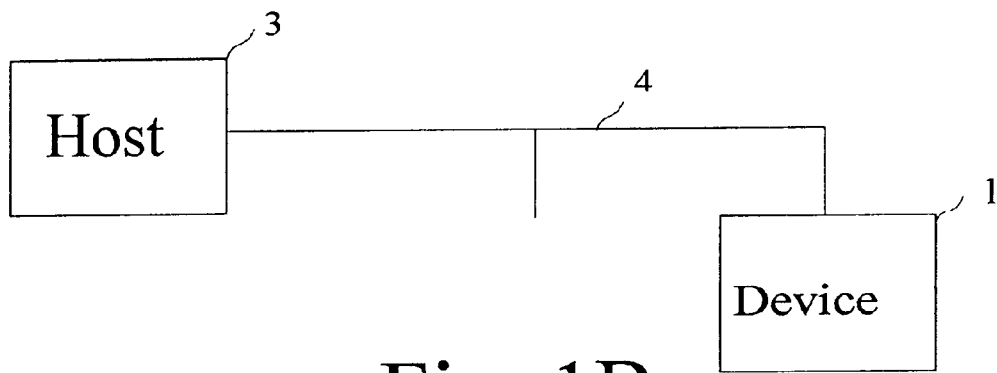
Figure 1C:
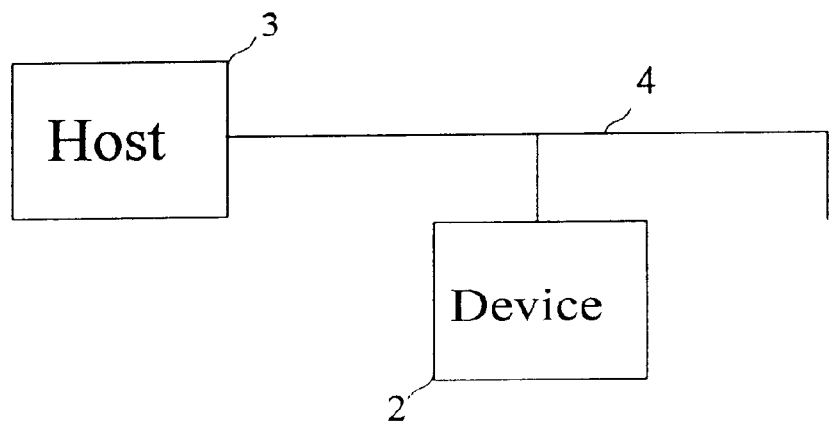
Figure 3:
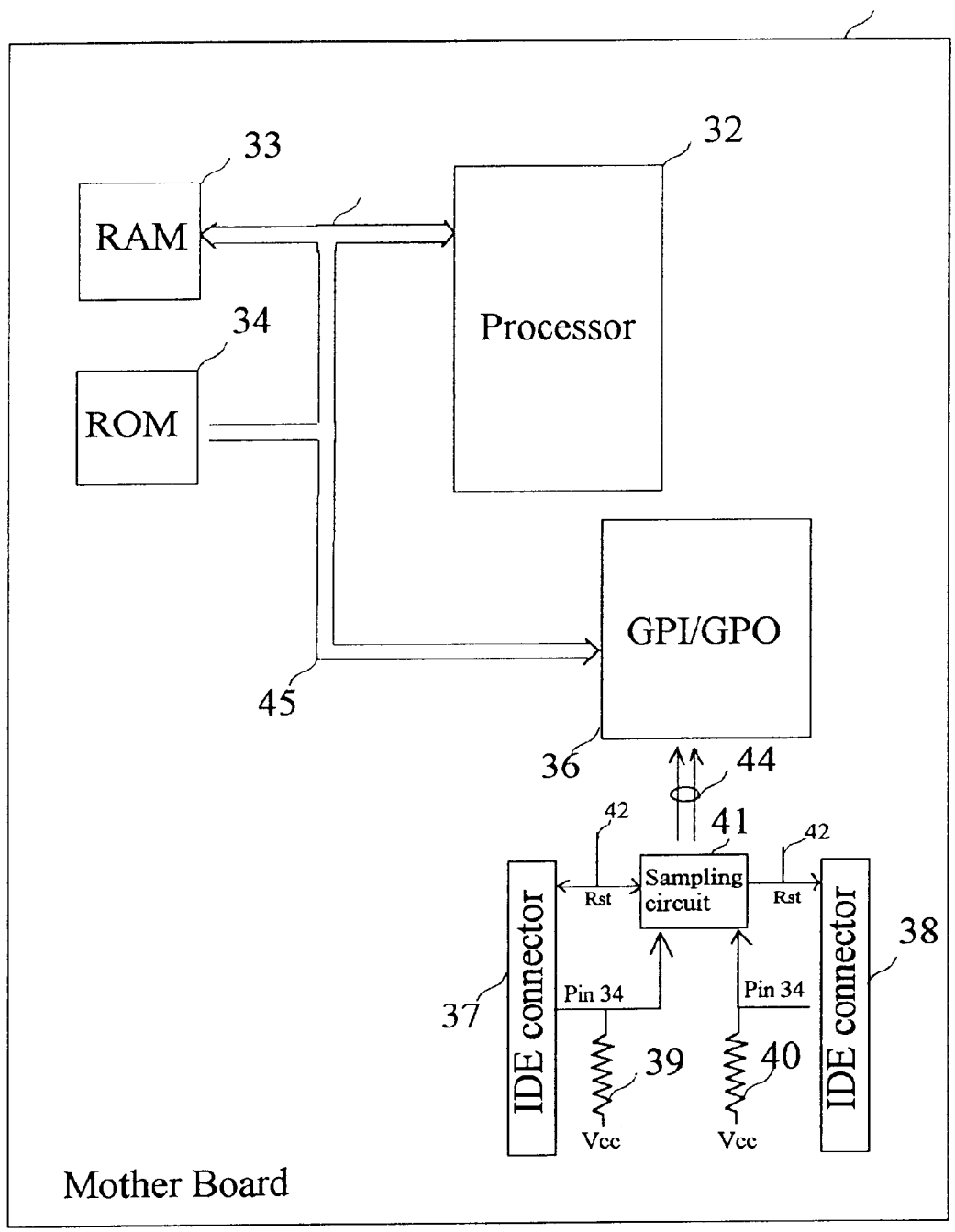
FIG. 3 shows a preferred embodiment of the invention which operates during the general reset of the machine.

FIG. 3 shows a first embodiment of the cable detection method and apparatus in accordance with the present invention. A motherboard 31 comprises a processor 32 having access to RAM memory 33 and ROM memory 34 containing the Basic Input Output System (BIOS) program via traditional address, data and control bus 45. The motherboard is also fitted with a functional chip 36 which is connected to the bus 45, and which provides with General Purpose Input and General Purpose Output functions (GPI/GPO). Generally speaking, the GPI/GPO 36 are embodied in a specialized chip which also provides with the traditional floppy, keyboard and mouse control functions, in addition to the GPI/GPO functions. For instance, GPI/GPO chip 36 could be embodied in a chip known under the designation "Super I/O NS87364" and manufactured by National Semiconductor Inc. Any equivalent device could however be utilized. Motherboard 31 additionally includes one, and more generally two IDE connectors 37 and 38 which respectively provide primary and secondary channels, each one allowing attachment of two devices. This attachment is performed by means of a cable (not shown in FIG. 2), which can be either the popular 40-conductor IDE cable or, as explained above, the Ultra ATA 66 80-conductor cable.

Each host connector 37 and 38 has the $34^{th}$ pin which is connected to a pull-up resistor, respectively pull-up resistor 39 and pull-up resistor 40, and also to one corresponding input of a sampling circuit 41. Sampling circuit 41 includes latches for storing the electrical state of pin 34 of both connectors 37 and 38, and the latches receive reset control signals (not shown) which are independent of the main reset control signals of the motherboard, on lead 42. The internal reset of sampling circuit 41 is arranged to occur before the main reset control signal on lead 42, so that sampling circuit 41 is fully operational during the main reset of the machine. The main reset control signal on lead 42 is entered into sampling circuit 41 and is used for controlling the sampling process of the logical state of pin 34 of connectors 37 and 38 during the main reset pulse on lead 42. As mentioned above, this is achieved since sampling circuit 41 has its own reset control signal which is independent from the main reset signal. To achieve this, sampling circuit 41 includes logic elements, such as latches and control circuitry for providing the internal reset and sampling control from the main reset pulse on lead 42 which is transmitted to all the parts of the machine, and particularly the devices attached to the motherboard. It should be observed that, on a motherboard, there usually exists circuits which are operational before the main reset of the machine. The practical design and realization of such hardware circuits is within the scope of an ordinary person skilled in the art. Different practical approaches may be used for embodying this circuit, such as the use of a D-latch having its own reset control or any other circuit. For this reason, the internal description of sampling circuit 41 will not be described in detail.

Pin 34 of connector 37 or 38 is normally dedicated to receive, as explained above, the PDIAG# signal when a 40-conductor IDE cable is attached to the host connector. Conversely, when the Ultra-ATA 80-conductor is attached to the connector, for instance connector 37, pin $34^r$ is clamped to the ground voltage because of the internal ground wiring made in the enclosure of the Ultra ATA cable connector. During the general reset of the machine and the devices, which is controlled by a reset pulse on lead 42 as shown in FIG. 3, sampling circuit 41 carries out a sampling of the logical state of pin 34 of both connectors 37 and 38, and stores the sensed value into its internal registers or latch. The value stored is then made available to the GPI/GPO device 36 via leads 44 as long as no new system reset occurs. GPI/GPO 36 are able to show the values into its own register and make it available, at any subsequent time, to the processor 32.

Because it has been shown that a very large number of different devices, such as CDROM, put the PDIAG# pin in a tri-state during the reset pulse, sampling circuit 41 detects a value which can be used for distinguishing the actual cable which is used on the connectors 37 or 38. Indeed, the voltage is set to the ground only when the Ultra ATA cable is present, and set to a positive (or negative) voltage if the usual IDE 40-conductor cable is employed. Therefore, with the first embodiment of the cable detection, after the power-on reset of the machine, as soon as processor 32 becomes operational, it may address the GPI/GPO internal register in order to read the values sampled by sampling circuit 41 and, accordingly, under control of BIOS loaded into ROM 34, can determine the actual Ultra-DMA mode and rate to use.

Figure 4:
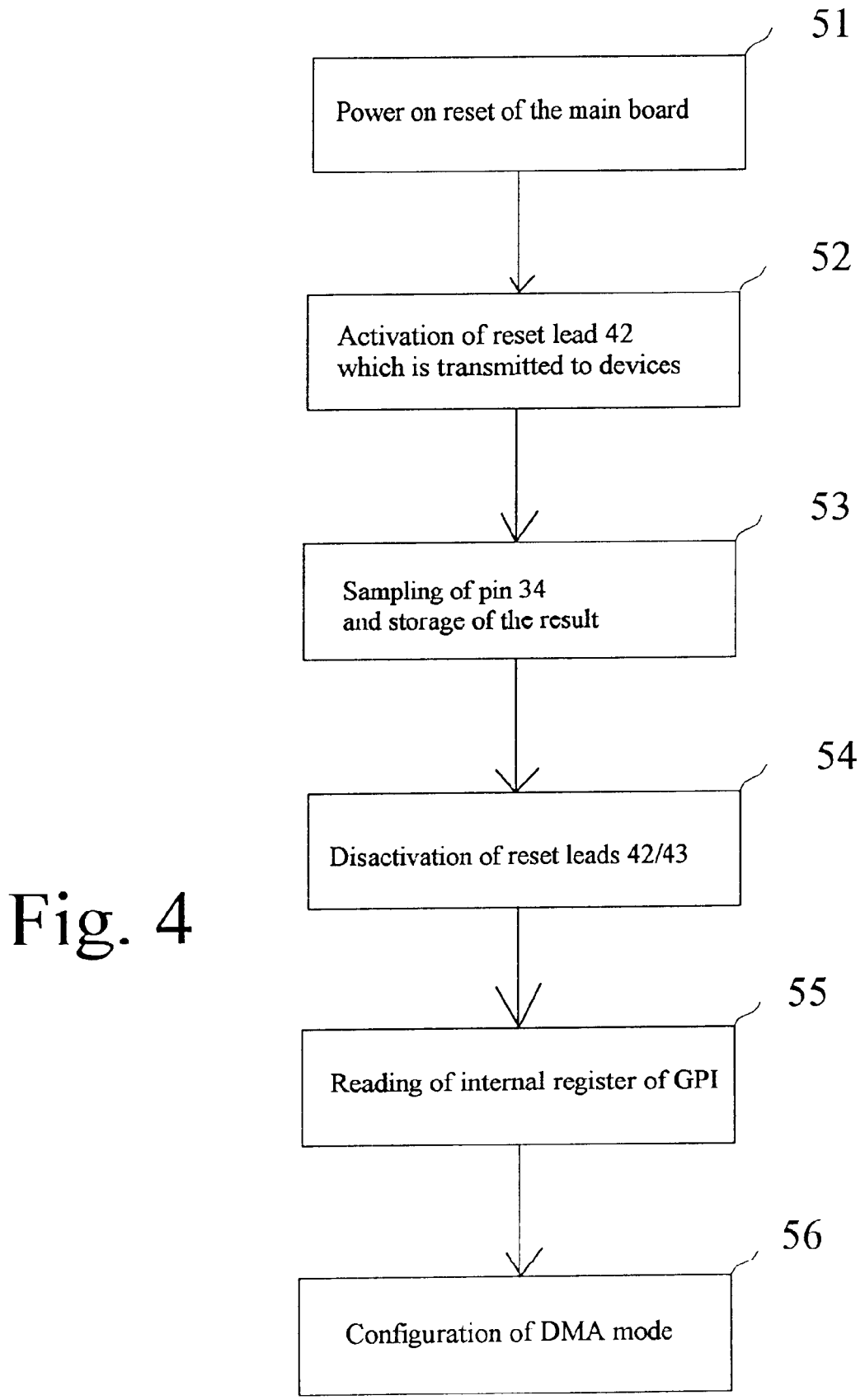
FIG. 4 illustrates a cable detection process which is used in a second embodiment of the invention.

With respect to FIG. 4 there will be now described a flow diagram of a second embodiment of the cable detection process, which obviates the need for sampling circuit 41 of FIG. 3. In this embodiment, the pin 34 of host connectors 37 and 38 are directly connected to the GPI/GPO chip 36 via leads 44, and the sampling process will be controlled by the main processor 32. The process starts with a first step 51 which is the general reset which follows the power-on reset of all the different components on the motherboard, as well as the devices which also receives the reset pulse and initiate their own diagnostic procedure. When the power-on reset completes, the processor 32 takes full control of the mother bards and may starts any transaction through the IDE cable. As mentioned above, when slave device 2 has passed its diagnostics, it issues an active PDIAG# signal which is conveyed on the $34^{th}$ conductor of the cable, either the 40-conductor cable or the Ultra-ATA. If the slave device does not conform with the ATA-3 and subsequent standards, it might not release the $34^{th}$ pin after having received the first command from processor 32 and this low state is conveyed to the pin $34^{th}$ of the host connector when a normal 40-conductor cable is used. Therefore, in this case, slave device continuously generates a low voltage on pin $34^{th}$ which, as explained above, would prevent the correct discrimination of the cable being used.

Step 51 is then followed by step 52 where processor 32 activates the reset leads 42 (which are only transmitted to the devices in this second embodiment). This can be achieved by means of a General Purpose Output element into GPI/GPO device 36 which can be used in order to generate, under control of processor 32, the start of a reset pulse which is transmitted via the cable to the devices.

Then, in a step 53, the reset lead 42 being still activated, the processor controls the GPI/GPO device 36 in order to cause the sampling of the electrical voltage carried by pin $34^{th}$ of both host connectors 37 and 38, and its storage into the GPI/GPO device 36.

Then, in a step 54, processor 32 controls the General Purpose Output element used in step 52 in order to disactivate the state of lead 42. This causes the discontinuing of the reset pulse. Since the sampling was performed during the reset pulse—lasting between step 52 and 54, for instance in the middle of the reset pulse on lead 42, the sampling process provides a precise information regarding the type of cable which is actually connected.

In a step 55, the process addresses GPI/GPO device 36 in order to read the value being stored into sampling circuit 41. It should be noticed that this reading operation could occur prior to the discontinuing of the reset pulse by processor 31.

Then, in a step 56, the processor may control the Ultra-DMA mode in accordance with the read operation performed in step 55.

Figure 5:
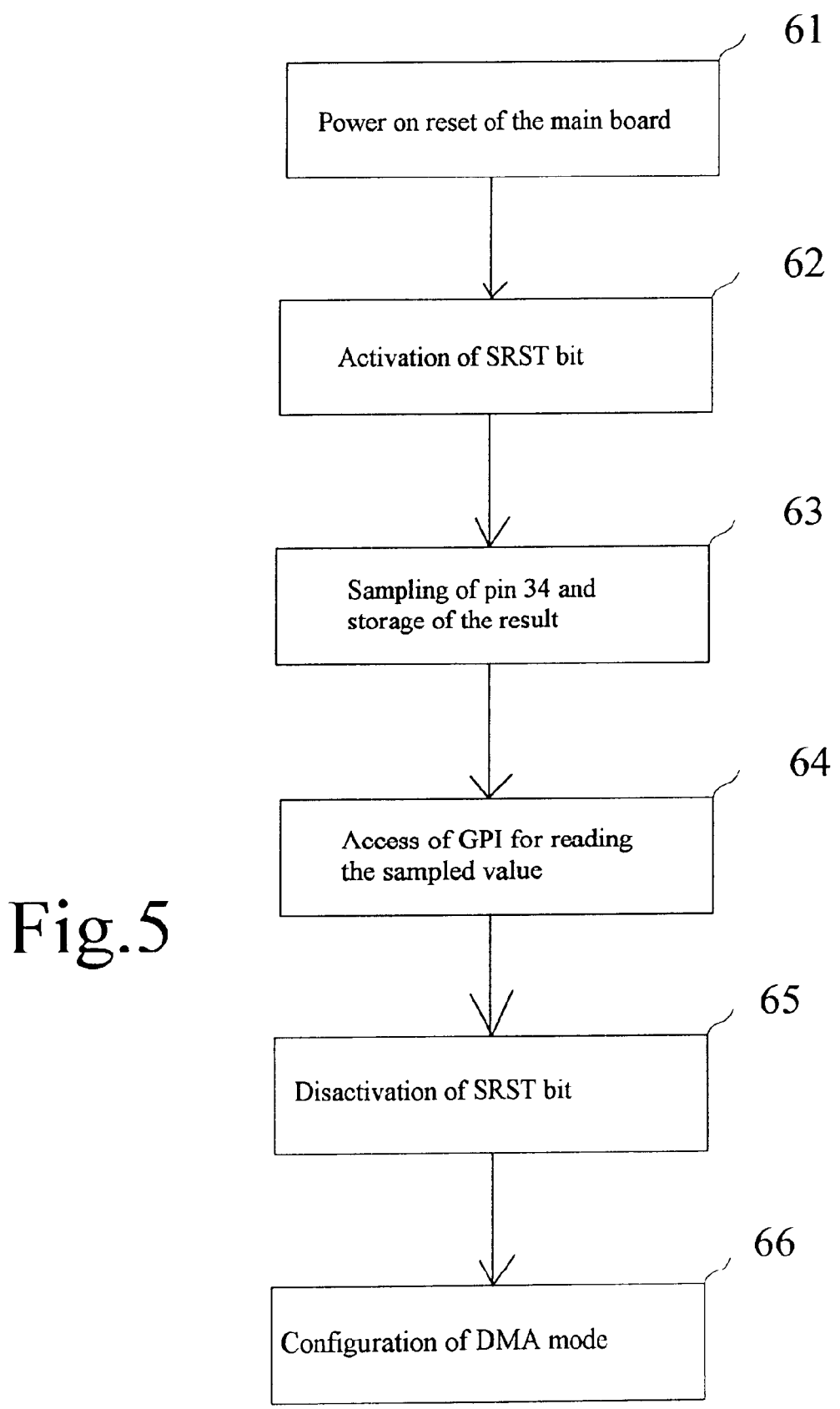
FIG. 5 illustrates a flow chart involved in the third embodiment of the invention.

Therewill be now described a third embodiment of the cable detection process which is a derived form of the second embodiment. This third embodiment appears particularly advantageous since it permits to incorporate the procedure in any existing motherboard, only by means of a software modification. Without hardware changes, the cable detection of this alternative way can embodied in any motherboard which has GPI/GPO device 36 being connected to sample pin $34^{th}$ of the host connector. FIG. 5 shows the general flow chart of this third embodiment.

The process starts with step 61 which corresponds to the general reset of the machine.

As previously, when the processor 32 takes the full control of the motherboard, the latter issues, in a step 62, a software reset control by means of an appropriate transaction on the IDE bus. This can be performed by setting the Software Reset bit (SRST) bit in the Device control register corresponding to the device being attached to the considered host connector. This is achieved by means of an appropriate IDE transaction, which is decoded by the two devices connected to a same host connector, and which results in the setting of the SRST bit.

Then, in a step 63, processor 32 controls GPI/GPO device 36 in order to sample the logical value carried by pin 34 of host connector 37 or 38, and the value is then stored into the internal register of GPI/GPO device 36.

Then, in a step 64, processor 32 addresses the GPI/GPO device 36 and performs a read operation of the internal register therein in order get access to the value sampled.

In a step 65, processor 32 disactivates the bit SRST bit to 0 in order to end the reset pulse and the devices can initiate the diagnostics procedures.

In a step 66, the processor controls the accurate Ultra-DMA mode in accordance with the value read into the GPI/GPO device 36.

The embodiments which were described above shows that the cable detection process can be effectively achieved, either by means of hardware sampling circuit 41 of FIG. 3 or under software control by processor 32. In the first case the sampling may occur during the general reset after power-on of the machine while, the latter, the sampling is executed during a second reset issued by the processor after the power-on reset.

While the invention has been particularly described in reference with the detection of the Ultra-ATA cable, and its discrimination with the popular IDE cable, it should be noticed that the invention is not limited to this particular technology but could be used in another context where there is a need for distinguishing a low quality and a high quality cable being attached to a same host connector. More generally, this invention explains how to read a given information on a (group of) line(s) carrying two or more multiplexed information on this line.

What is claimed is:

1. Process for configuring a motherboard or host computer (3) to communicate with at least one device or peripheral storage at a first speed or at a second higher speed, said motherboard or host computer (3) comprising processing means (32), storage means (33, 34), and at least one host connector (37, 38) for receiving attachment to said device or peripheral storage (1, 2), said attachment being made by either a first cable of medium quality allowing said first speed communication without data corruption, or a second cable of high-quality permitting said second speed communication without data corruption, said medium quality cable having one particular conductor which is released by said at least one device or peripheral storage (1, 2) upon reception of a reset pulse;
said high-quality cable having said particular conductor being cut and the corresponding terminal which is located on the host side being internally wired in the enclosure of said high-quality cable in order to received a first voltage; and said particular terminal being pulled-up on the motherboard or said host computer to a second voltage;

characterized in that said process involves the steps of:
sampling the logical state carried by said particular terminal during a reset pulse which is transmitted to said at least one device or peripheral storage (1, 2);
configuring said motherboard or host computer (3) in accordance with the logical state sampled.

2. Process as defined by claim 1 characterized in that said medium quality cable is a IDE cable and said high-quality cable is a 80-conductors cable allowing Ultra-ATA 66 communication mode, having its $34^{th}$ conductor being cut and internally wired to the ground on the host connector side.

3. Process as defined in claim 1 characterized in that said sampling is being performed during the main power-on reset by means of sampling means (41) which receives independent reset control signal prior to the main reset control signal.

4. Process as defined in claim 2 characterized in that said sampling is performed under control of processing means (32) which performs the following steps:
controlling a General Purpose Output means (36) in order to generate a reset pulse which is transmitted to at least one device or peripheral storage (1, 2) via the attached cable;
controlling a General Purpose Input means (36) during said reset pulse in order to sample the electrical voltage of said particular terminal;
reading the value sampled by said General Purpose Input means (36);
configuring the Ultra-DMA mode in accordance with the value sampled.

5. Process as defined in claim 4 characterized in that in order to generate said reset of said at least one device or peripheral storage (1, 2), said processing means issues an appropriate command via an IDE transaction.

6. Motherboard or host computer (3) having means for communicating with at least one device or peripheral storage at a first speed or at a second higher speed, and comprising processing means (32), storage means (33, 34), and at least one host connector (37, 38) for receiving attachment to said at least one device or peripheral storage (1, 2), said attachment being made by either a first cable of medium quality for operation at said first speed or a second cable of high-quality for operation at said second higher speed without data corruption,
said medium quality cable having one particular conductor which is released by said at least one device or peripheral storage (1, 2) upon reception of a reset pulse;
said high-quality cable having said particular conductor being cut and the corresponding terminal which is located on the host side being internally wired in the enclosure of said high-quality cable in order to received a first voltage; and
said motherboard or host computer (3) having a pull-up resistance connected between said particular terminal and a second voltage;
said motherboard or host computer being characterized in that it further comprises:
means (41) for sampling the logical state carried by said particular terminal during a reset pulse which is transmitted to said at least one device or peripheral storage (1, 2);
means for configuring the communication mode in accordance with the logical state sampled.

7. Motherboard or host computer as defined in claim 6 characterized in said host connector (37, 38) is adapted to receive attachment of a medium quality IDE cable or a 80-conductors cable allowing Ultra-ATA (Ultra-DMA) 66 mode, having its $34^{th}$ pin being cut and internally wired to the ground on the host connector side.

8. Motherboard or host computer as defined in claim 6 characterized in that it comprises means (41) for sampling said particular terminal during the main power-on reset.

9. Motherboard or host computer (3) as defined in claim 7 characterized in that it includes;
means (36) for sampling the electrical voltage of said particular terminal during a second reset which is issued by said processing means (32) after the main power-on reset;
a General Purpose Output means (36) under control of said processing means (32) for generating a second reset pulse which is transmitted to at least one device or peripheral storage (1, 2) via the attached cable;
a General Purpose Input means (36) under control of said processing means (32) for sampling the electrical voltage of said particular terminal during said second reset pulse.

10. Motherboard or host computer (3) as defined in claim 9 characterized in that it comprises means for issuing an appropriate command via an IDE transaction in order to generate a software reset of the devices or peripheral storage attached to the cable.

11. Process for validating the assembling of an Information Handling System (IHS) comprising a motherboard (3) dedicated to communicate with at least one device or peripheral storage potentially attached via a cable, said motherboard comprising processing means (32), storage means (33, 34), and at least one host connector (37, 38) for receiving attachment to said at least one device or peripheral storage (1, 2) via said cable; said attachment being made by either a first cable of medium quality allowing said first speed communication without data corruption, or a second cable of high-quality permitting said second speed communication without data corruption,
said medium quality cable having one particular conductor which is released by said at least one device or peripheral storage (1, 2) upon reception of a reset pulse;
said high-quality cable having said particular conductor being cut and the corresponding terminal which is located on the host side being internally wired in the enclosure of said high-quality cable in order to received a first voltage; and
said particular terminal being pulled-up on the motherboard to a second voltage;
characterized in that said process involves the steps of:
sampling the logical state carried by said particular terminal during a reset pulse which is generated by said mother board and transmitted to said at least one potentially attached device or peripheral storage (1, 2);
determining the presence of said high quality cable in accordance with the logical state being sampled in order to validate said assembling.

12. Process for configuring a computer (3) to communicate with at least one device at a first speed or at a second higher speed, said computer (3) comprising a processor (32), a storage device (33, 34), and at least one connector (37, 38) for receiving attachment to said device (1, 2), said attachment being made by either a cable of a first type allowing said first speed communication without data corruption, or a cable of a second type permitting said second speed communication without data corruption, said first type of cable having one particular conductor which is released by said at least one device or peripheral storage (1, 2) upon reception of a reset pulse;

said second type of cable having said particular conductor being cut and the corresponding terminal which is located on the host side being internally wired in the enclosure thereof in order to received a first voltage; and said particular terminal being pulled-up on the computer to a second voltage;

said process including the steps of:

sampling the logical state carried by said particular terminal during a reset pulse which is transmitted to said at least one device (1, 2);

configuring said computer (3) in accordance with the logical state sampled.

\* \* \* \* \*

UNITED STATES PATENT AND TRADEMARK OFFICE
CERTIFICATE OF CORRECTION

PATENT NO. : 6,523,071 B1
DATED : February 18, 2003
INVENTOR(S) : Werner Klinger et al.

It is certified that error appears in the above-identified patent and that said Letters Patent is hereby corrected as shown below:

<u>Title page,</u>
Item [57], ABSTRACT,
Line 2, change "host computer (3)" to -- host computer --

<u>Column 9,</u>
Line 57, change "to received" to -- to receive --

<u>Column 10,</u>
Line 50, change "received" to -- to receive --

<u>Column 11,</u>
Line 12, change "to received" to -- to receive --

Signed and Sealed this

Ninth Day of August, 2005

JON W. DUDAS
*Director of the United States Patent and Trademark Office*